US011022205B2

(12) United States Patent
Leemann et al.

(10) Patent No.: US 11,022,205 B2
(45) Date of Patent: Jun. 1, 2021

(54) TRANSMISSION MODULE, GRIPPER MODULE WITH TRANSMISSION MODULE AND GRIPPER DEVICE WITH GRIPPER MODULE

(71) Applicant: TECAN TRADING AG, Mannedorf (CH)

(72) Inventors: Joas Leemann, Baretswil (CH); Christoph Latzer, Gruningen (CH)

(73) Assignee: TECAN TRADING AG, Mannedorf (CH)

( * ) Notice: Subject to any disclaimer, the term of this patent is extended or adjusted under 35 U.S.C. 154(b) by 0 days.

(21) Appl. No.: 16/709,303

(22) Filed: Dec. 10, 2019

(65) Prior Publication Data
US 2020/0200248 A1    Jun. 25, 2020

(30) Foreign Application Priority Data
Dec. 20, 2018   (EP) .................................... 18214509

(51) Int. Cl.
| F16H 37/06 | (2006.01) |
| B66C 1/44 | (2006.01) |
| B66C 17/00 | (2006.01) |
| F16H 1/36 | (2006.01) |
| F16H 19/04 | (2006.01) |

(52) U.S. Cl.
CPC ........... *F16H 37/065* (2013.01); *B66C 1/445* (2013.01); *B66C 17/00* (2013.01); *F16H 1/36* (2013.01); *F16H 19/04* (2013.01); *F16H 2702/02* (2013.01)

(58) Field of Classification Search
CPC ............................. B25J 15/026; F16H 37/065
See application file for complete search history.

(56) References Cited

U.S. PATENT DOCUMENTS

| 6,264,419 | B1* | 7/2001 | Schinzel | ................... B25J 9/023 |
| | | | | 294/119.1 |
| 2014/0352493 | A1* | 12/2014 | Chung | .................. F16H 37/065 |
| | | | | 74/813 R |
| 2015/0151438 | A1* | 6/2015 | Hecht | ................... B25J 15/0004 |
| | | | | 294/192 |

* cited by examiner

*Primary Examiner* — Gerald McClain
(74) *Attorney, Agent, or Firm* — Notaro, Michalos & Zaccaria P.C.

(57) ABSTRACT

A transmission module for transmitting torques having a base, a first drive shaft, a second drive shaft parallel thereto, a first output shaft and a second output shaft, both rotatable about a common axis, the axes of the drive shafts are arranged parallel to the axis of the output shafts, a gear unit, where the two drive shafts, the gear unit and the first output shaft are rotatably supported in the base, and the second output shaft is rotatably supported in the first output shaft and the gear unit is designed in such a way that a synchronous rotary movement of the two output shafts can be effected by a rotary movement of the first drive shaft and a relative rotary movement of the two output shafts can be effected by a rotary movement of the second drive shaft.

15 Claims, 7 Drawing Sheets

A - A

B - B

C - C

TRANSMISSION MODULE, GRIPPER MODULE WITH TRANSMISSION MODULE AND GRIPPER DEVICE WITH GRIPPER MODULE

TECHNICAL FIELD OF THE INVENTION

The present invention relates to a transmission module, in particular a transmission module having two parallel drive shafts and two concentric output shafts.

DESCRIPTION OF THE RELATED ART

Transmission modules are known from the prior art in which two parallel drive shafts are converted into two concentric output shafts. Such transmission modules comprise an outer shaft and an inner shaft arranged therein. The outer shaft is driven by a first drive and the inner shaft is driven by a second drive. If the two shafts are to rotate synchronously with each other, the two drives must rotate synchronously with each other. If the two shafts are to rotate relative to each other with a relative movement relative to each other, the two drives must rotate with a relative movement relative to each other. This is complex with regard to control technology and both drives must be designed for continuous operation, although this would not actually be necessary, since relative movement is rarely required in comparison to synchronous movement.

SUMMARY OF THE INVENTION

It is one object of the present invention to provide a transmission module that avoids the aforementioned disadvantages.

This object is solved by a transfer module with the features of claim 1. Further embodiments of the transmission module, a gripper module with a transmission module according to the invention, as well as a gripper device with a gripper module according to the invention are defined by the features of further claims.

A transmission module according to the invention for transmitting torques comprises a base, a first drive shaft rotatable about a first axis, a second drive shaft parallel thereto rotatable about a second axis. The transmission module further comprises a first output shaft and a second output shaft, both of which are rotatable about a common third axis, wherein the axes of the drive shafts are arranged parallel to the axis of the output shafts. The transmission module further comprises a gear unit, wherein the two drive shafts, the gear unit and the first output shaft are rotatably supported in the base and wherein the second output shaft is rotatably supported in the first output shaft. The gear unit is designed in such a way that a synchronous rotary movement of the two output shafts can be effected by a rotary movement of the first drive shaft and that a relative rotary movement of the two output shafts can be effected by a rotary movement of the second drive shaft. Thus it can be achieved that the first drive shaft drives the first and second output shafts together and synchronously with each other, and that the second drive shaft generates a relative movement between the first output shaft and the second output shaft. Therefore, only the drive of the first drive shaft must be designed for an extended service life and the drive of the second drive shaft must only be designed for the service life of the relative movement. With such a design, the two drives are completely independent of each other and do not have to be synchronized with each other at any time. This design is also very compact and scalable over a very wide range of dimensions.

In one embodiment, the gear unit comprises a planetary gear with a sun gear, a planet carrier, at least one planet gear and a second ring gear, wherein the first drive shaft is operatively connected to and can drive the first output shaft. The first drive shaft is operatively connected to the second output shaft by the gear unit and can drive it. The second drive shaft is operatively connected to the second output shaft by the gear unit and can drive it. The planetary gear can comprise two, three or more planetary gears.

In one embodiment, the gear unit comprises a central gear shaft which is rotatable about the third axis. The sun gear is firmly connected to a first end of the gear shaft. The planet carrier is rotatably mounted on the gear shaft. A second spur gear, adjacent to the planetary gear, is firmly connected to the gear shaft.

In one embodiment, a first spur gear is firmly connected to the first drive shaft and the first spur gear is operatively connected to the first output shaft via the sun gear of the planetary gear.

In one embodiment, a fifth spur gear is firmly connected to the second drive shaft and the fifth spur gear is operatively connected to the second output shaft via the planet carrier of the planetary gear.

In one embodiment, the gear unit comprises a sixth spur gear, which is firmly connected to the planet carrier.

In one embodiment, the planet carrier is rotatably mounted on the gear shaft by the sixth spur gear.

In one embodiment, the first output shaft comprises a housing which completely surrounds the gear unit and which comprises a first housing part and a second housing part firmly connected thereto.

In one embodiment, the transmission module comprises a first ring gear which is rotatably mounted in the base and which is firmly connected to the first housing part.

In one embodiment, the second ring gear of the planetary gear is rotatably mounted in the first housing part and is firmly connected to the second output shaft.

In one embodiment, the second housing part comprises a central passage opening, which is in alignment with the third axis and through which the second output shaft protrudes.

In one embodiment, the base comprises a plate-shaped first base part and a bracket-shaped second base part, which are firmly joined together.

In one embodiment, the first ring gear is rotatably mounted in the first base part. The first drive shaft, the second drive shaft and the central gear shaft are rotatably mounted in the second base part.

The above mentioned types of the transmission module can be used in any combination, as long as they do not contradict each other.

A gripper module according to the invention comprises a transmission module according to one of the preceding embodiments and a gripper unit. The gripper unit comprises at least two grippers which are displaceably mounted in the first output shaft in a first plane perpendicular to the third axis and which can be displaced by the second output shaft. In the case of two grippers, these can be arranged opposite each other with respect to the third axis. Three grippers can be arranged evenly around the third axis on the circumference and can be displaceable against the center of the gripper, i.e. against the third axis. The grippers may be designed in such a way that they can be fully retracted and can at least partially touch each other or, when retracted, they may have a distance from each other smaller than the objects to be gripped.

In one embodiment, the at least two grippers are displaceably mounted in the second housing part. For example, the grippers can be mounted on guide rails.

In one embodiment, each gripper is firmly connected to a rack and the rack is displaceably mounted in the first output shaft in the first plane. The second output shaft comprises an output wheel which is operatively connected to each rack and with which each rack is displaceable. With such a design, all grippers can be moved synchronously with one another with one drive. Alternatively, spindle drives, belt drives, chain drives or the like can be used to convert the relative rotary motion between the first output shaft and the second output shaft into a linear motion of the grippers.

In one embodiment, the gripper module comprises a cover through which at least the grippers project and which covers at least the racks.

The mentioned embodiments of the gripper module can be used in any combination as long as they do not contradict each other.

A gripper device according to the invention comprises at least one gripper module according to one of the previously described embodiments, a structure, an object holder and at least one displacement unit. The object holder is arranged on the structure with a first displacement unit. Alternatively or additionally, the gripper module with a second displacement unit is arranged on the structure. Such an embodiment ensures that the objects to be gripped can be moved to the gripper module and/or the gripper module can be moved to the object to be gripped. A structure, for example, can be a machine stand.

In one embodiment, the first displacement unit and/or the second displacement unit can perform displacements in a first horizontal direction and/or in a second horizontal direction perpendicular thereto and/or in a vertical direction.

In one embodiment, the gripper device comprises two or more gripper modules which are arranged directly or by means of a displacement unit on the structure.

The above mentioned embodiments of the gripper device can be used in any combination as long as they do not contradict each other.

BRIEF DESCRIPTION OF THE DRAWINGS

Embodiment examples of the present invention are explained in more detail below using the drawings. These are for explanatory purposes only and should not be construed as restrictive, wherein:

FIG. 4b shows a sectional view through the line B-B of FIG. 4a;

FIG. 4c shows a sectional view through the line C-C of FIG. 4a;

FIG. 4d shows a sectional view through the line D-D of FIG. 4a;

DETAILED DESCRIPTION OF THE INVENTION

Figure 1:
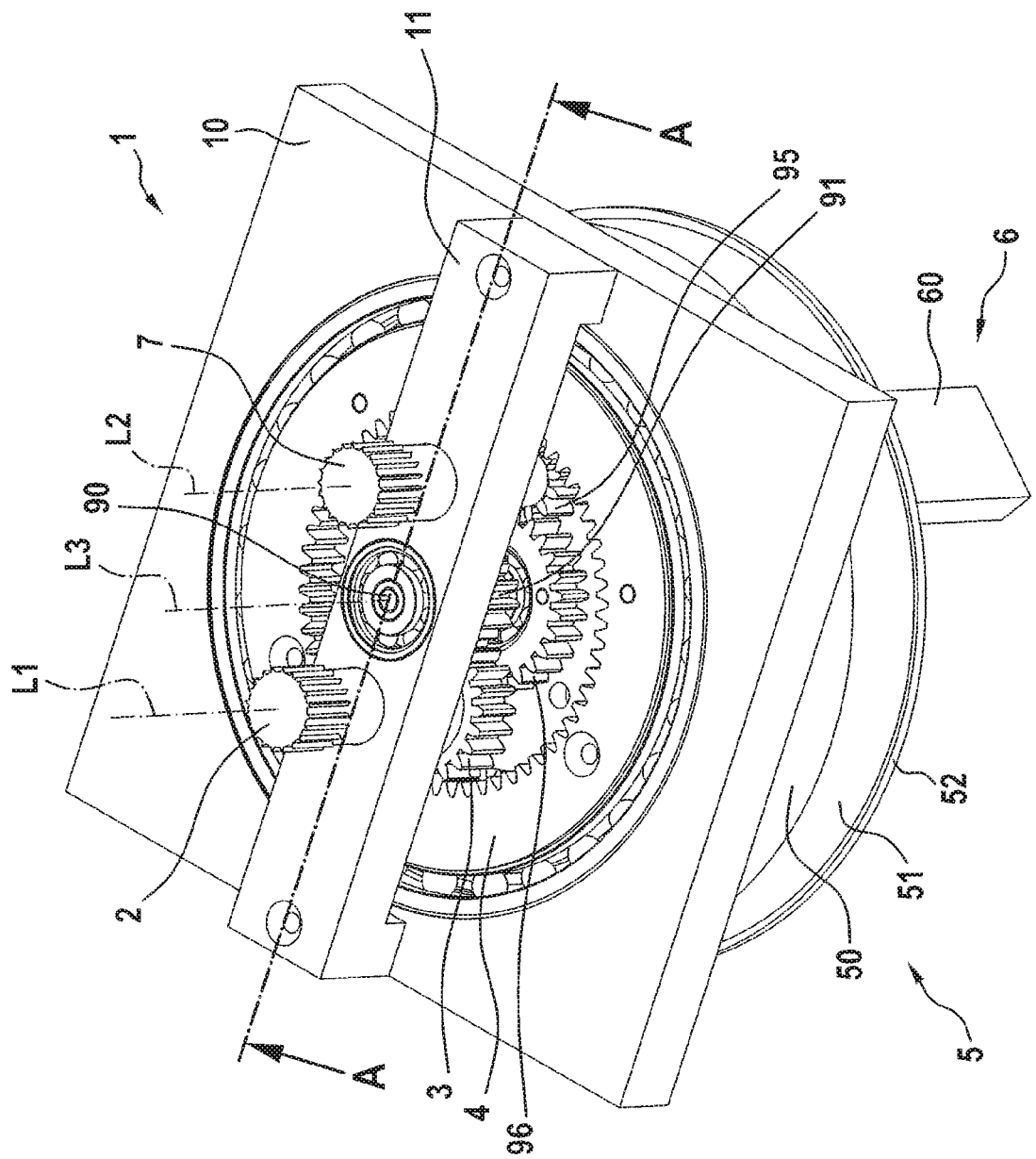
FIG. 1 shows a perspective view of a gripper module according to the invention.
Figure 2:
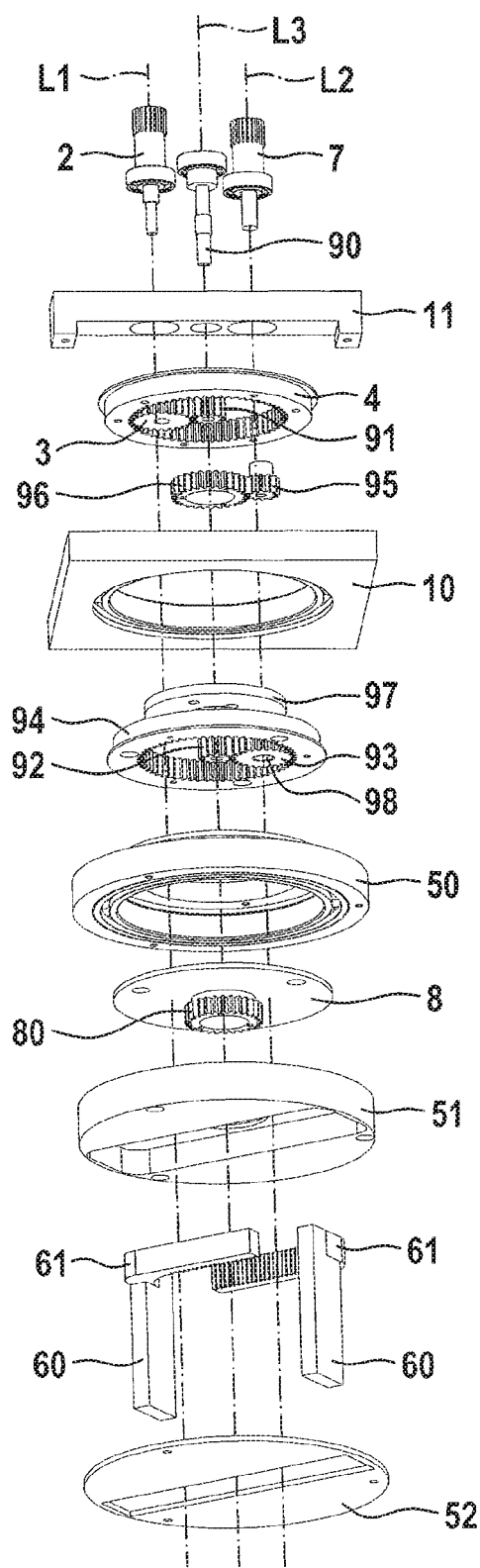
FIG. 2 shows a perspective exploded view of the gripper module of FIG. 1.
Figure 3:
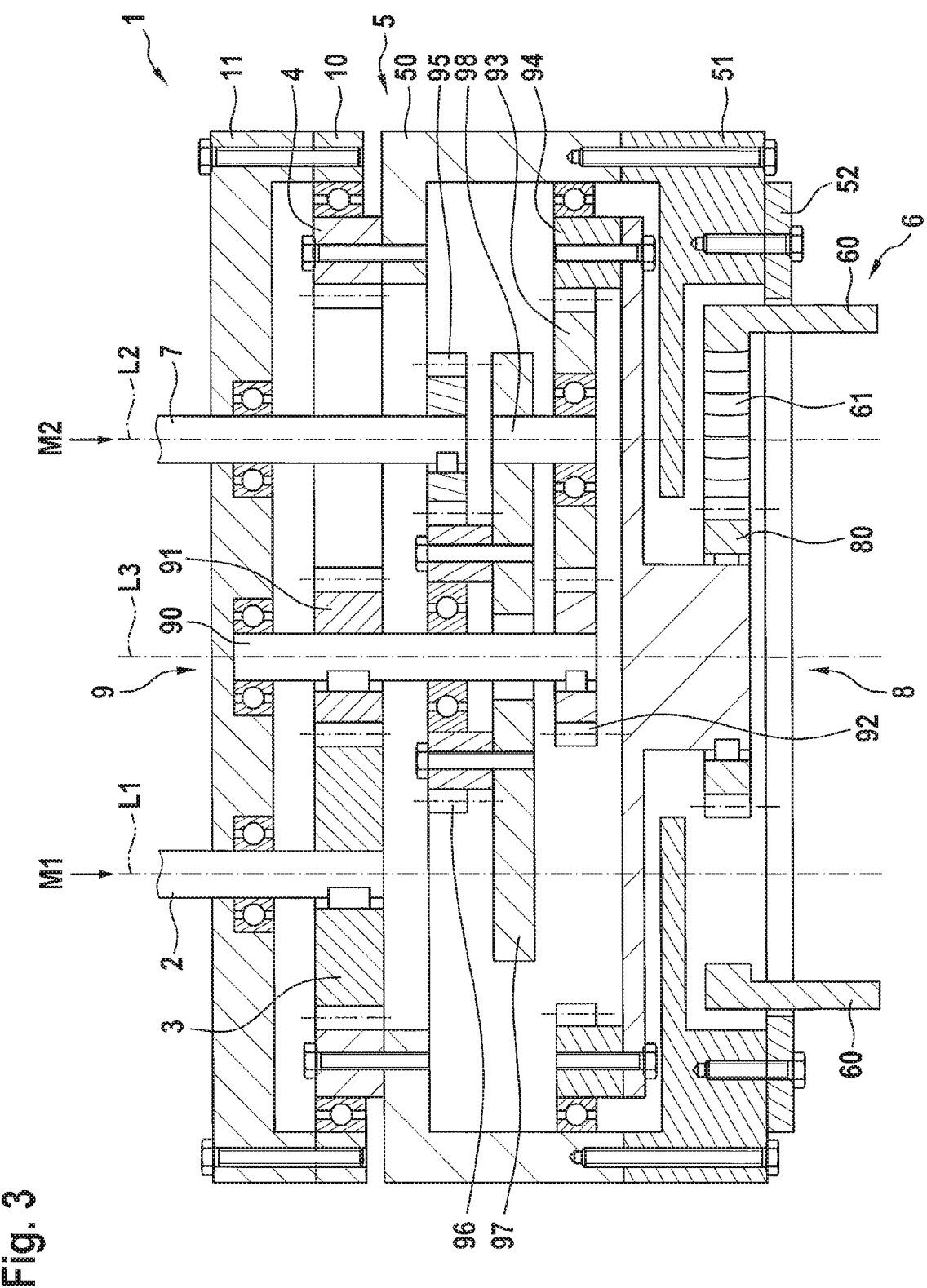
FIG. 3 shows a schematic sectional view of the gripper module of FIG. 1 along the line A-A.
Figure 4A:
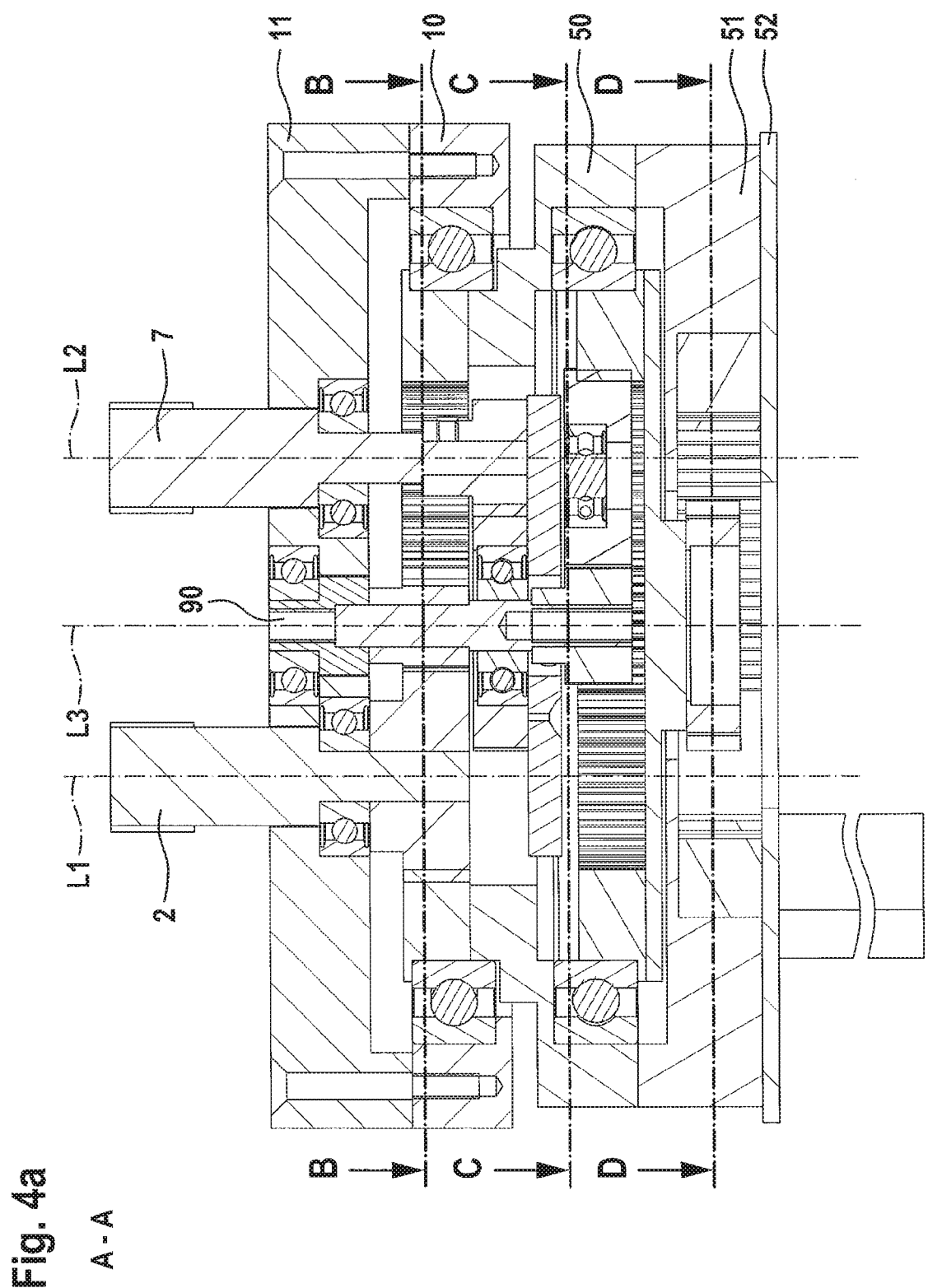
FIG. 4a shows a sectional view of the gripper module of FIG. 1 along the line A-A.
Figure 4B:
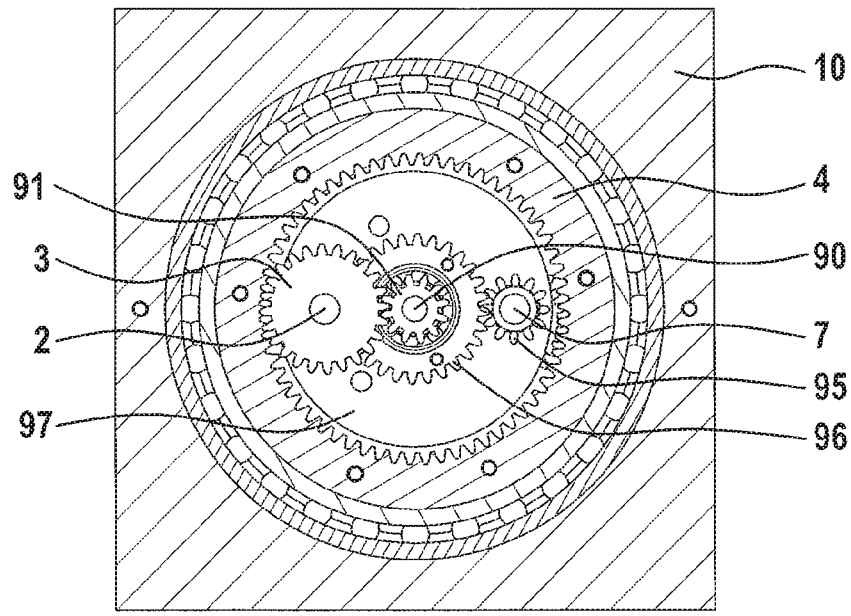
Figure 4C:
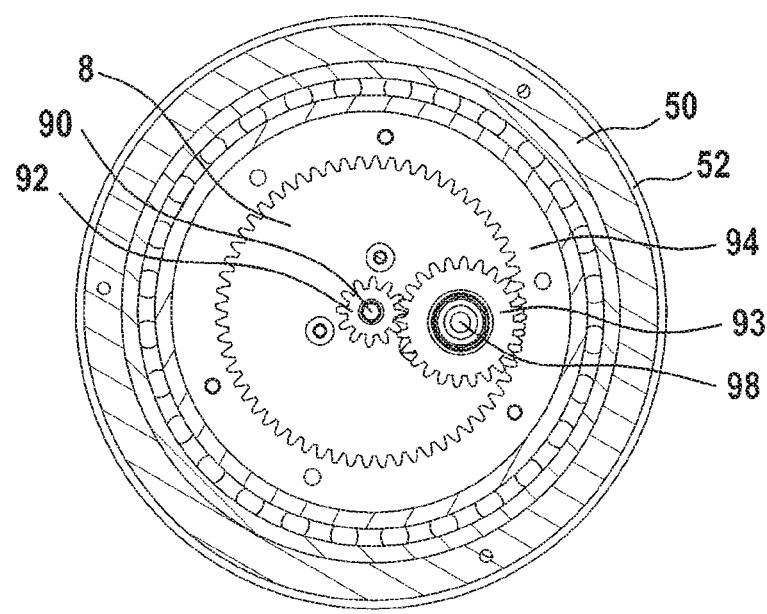
Figure 4D:
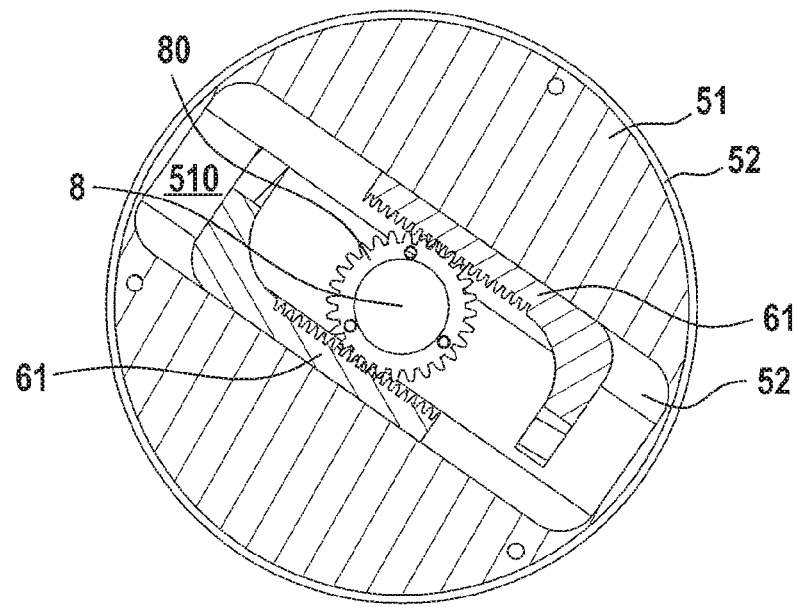

FIG. 1 shows a perspective view of a gripper module according to the invention, FIG. 2 shows a perspective exploded view of the gripper module of FIG. 1, FIG. 3 shows a schematic sectional view of the gripper module of FIG. 1 along the line A-A, FIG. 4a shows a sectional view of the gripper module of FIG. 1 along line A-A, FIG. 4b shows a sectional view through line B-B of FIG. 4a, FIG. 4c shows a sectional view through line C-C of FIG. 4a and FIG. 4d shows a sectional view through line D-D of FIG. 4a.

The gripper module comprises a transmission module and a gripper unit 6. The transmission module comprises a base 1 with a plate-shaped first base part 10 and a bracket-shaped second base part 11, which are firmly connected to each other. Bracket 11 extends from one side of plate 10 across the center to a side of plate 10 which is opposite thereto. Bracket 11 is firmly bolted to plate 10. A first drive shaft 2, a second drive shaft 7 and a gear shaft 90 of a gear unit 9 are rotatably mounted in bracket 11 by means of ball bearings. Alternative bearings such as roller bearings, needle roller bearings or plain bearings can also be used. The first drive shaft 1 is rotatable around a first axis L1, the second drive shaft 7 is rotatable around a second axis L2 and the gear shaft 90 is rotatable around a third axis L3. A first ring gear 4 is mounted with a ball bearing rotatable in the plate 10 of the base 1. A first spur gear 3 is firmly connected to the end of the first drive shaft 2 remote from the drive. The first spur gear 3 engages on the inside in the first ring gear 4. The first ring gear 4 is firmly connected to a first housing part 50 of the housing 5. The housing 5 represents the first output shaft 5, which can be rotated around the third axis L3. Housing 5 comprises the first housing part 50 close to the base and a second housing part 51 facing away from the base, which is firmly connected to the first housing part 50. The gear unit 9 extends from the base 1 to the housing 5, comprises the central gear shaft 90, a second spur gear 91, a planetary gear 92, 93, 94, 97, 98 and a sixth spur gear 96. The second spur gear 91 is firmly connected to the gear shaft 90 in a region close to the base and engages the first spur gear 3. The planetary gear comprises a sun gear 92 which is fixedly connected to the gear shaft 90 at an end remote from the base, a planet carrier 97 which is rotatably mounted on the gear shaft 90 adjacent to the sun gear 92, at least one planet shaft 98 on which a planet gear 93 is rotatably mounted, wherein the planet gear 93 engages in the sun gear 92, a second ring gear 94 which is rotatably mounted in the first housing part 50 and in which the at least one planet gear 93 engages on the inside. The sixth spur gear 96 is firmly connected to the planet carrier 97 on the side of the planetary gear facing the base. The sixth spur gear is rotatably mounted on the gear shaft 90. A fifth spur gear 95 is firmly connected at one end remote from the base to the second drive shaft 7 and engages in the sixth spur gear 96. A second output shaft 8 is firmly connected to the second ring gear 94 of the planetary gear. The second output shaft 8 protrudes through a central opening through the second housing part 51. An output wheel 80 is firmly connected to the second output shaft 8 at one end remote from the base. A gripper unit 6 is arranged in a recess 510 of the second housing part 51. The gripper unit 6 comprises at least two grippers 60, each of which comprises a rack 61 on a side facing the base. The grippers 60 extend substantially parallel to the first, second or third axis L1, L2, L3 and the racks 61 extend substantially perpendicular to these axes. The racks 61 engage in the output wheel 80. The recess 510 in the second housing part 51 is at least partially covered by a cover 52, wherein the cover 52 is firmly connected to the second housing part 51. At least one opening is provided in the cover 52 through which the grippers 60 protrude. In the embodiment shown, the first ring gear 4 and the second ring gear 94 have the same pitch circle diameter, the second spur gear 91, the sun gear 92 and the fifth spur gear 95 have the same pitch circle diameter and the first spur gear 3, the sixth spur gear 96 and the planetary gear 93 have the same pitch circle diameter. Due to this design, the transmission ratio of the first spur gear 3 to the first ring gear 4 corresponds to that of the first spur gear 3 via the gear unit 9 to the second ring gear 94. If the first drive shaft 2 is driven by a first drive M1, the first ring gear 4 and the second ring gear 94 rotate synchronously with each other. Independent of the movement of the first drive shaft 2, the second drive shaft 7 can be driven with a second drive M2. Accordingly, a relative movement between the first ring gear 4 and the second ring gear 94 can be produced, independent of the movement of the first ring gear 4. In general, a synchronous movement of the first output shaft 5 together with the second output shaft 8 is possible with such a transmission module if only the first drive shaft 2 is driven by the first drive M1 and a relative movement between the first output shaft 5 and the second output shaft 8 which is independent of the movement of the first drive shaft 2 is possible if the second drive shaft 7 is driven by the second drive M2.

Figure 5:
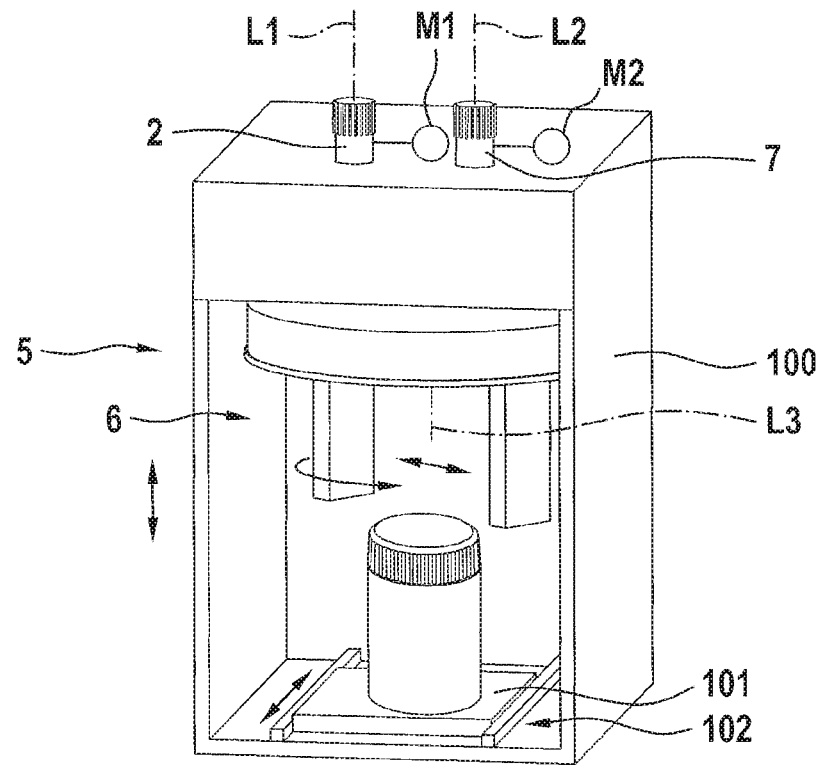
FIG. 5 shows a perspective view of a first embodiment of gripper device according to the invention.

FIG. 5 shows a perspective view of a first embodiment of a gripper device according to the invention. The gripper unit 6 is arranged on a structure 100 by means of the transmission module. A first drive M1 and a second drive M2 are arranged on the structure 100. With the first drive M1, the gripper unit 6 can be rotated about the third axis L3 and with the second drive M2, the grippers 60 of the gripper unit 6 can be moved together or up in any orientation. Below the transmission module, an object holder 101 is arranged at structure 100, in which objects to be rotated can be arranged, which are to be rotated as a whole or for which components are to be arranged or removed by rotation. For example, a cover of a container can be screwed on or off. The object holder 101 is arranged on a first displacement unit 102, with which the object holder 101 can be moved in a first horizontal direction. Alternatively or additionally further horizontal and/or vertical displacement units can be provided.

Figure 6:
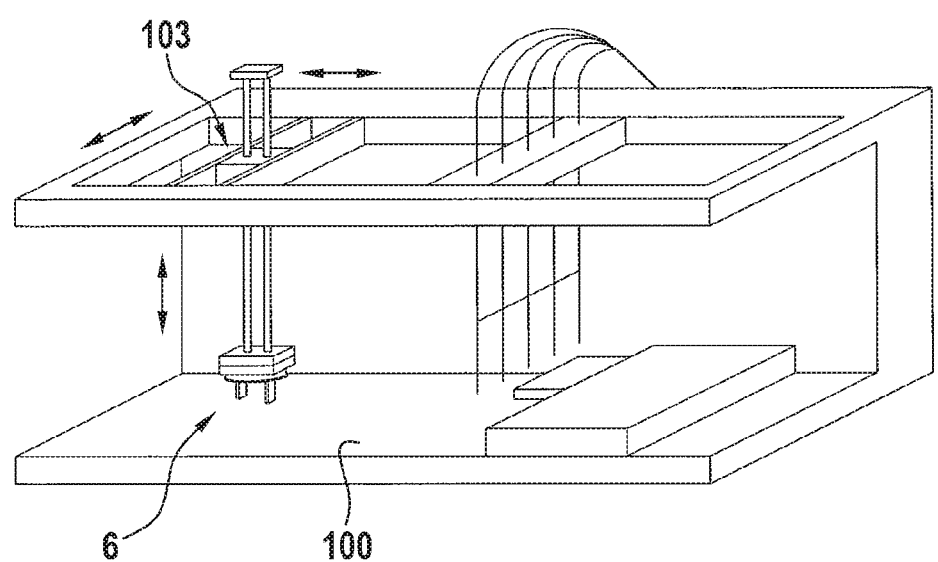
FIG. 6 shows a perspective view of a second embodiment of a gripper device according to the invention.

FIG. 6 shows a perspective view of a second embodiment of a gripper device according to the invention. A second displacement unit 103 is arranged on the structure 100, on which a gripper unit 6 is arranged by means of a transmission module in accordance with the invention. The second displacement unit 103 is designed as a portal and enables the gripper unit to be moved in a first horizontal direction, in a second horizontal direction perpendicular to the first horizontal direction and in a vertical direction. In the embodiment shown, structure 100 is a worktable with a portal arranged above it. Further stations can be provided on the worktable into which containers can be arranged by means of the gripper unit 6 and/or into which containers can be screwed on or off.

REFERENCE SIGNS LIST

| 1 | base |
| 10 | first base part |
| 11 | second base part |
| 2 | first drive shaft |
| 3 | first spur gear |
| 4 | first ring gear |
| 5 | housing |
| 50 | first housing part |
| 51 | second housing part |
| 510 | recess |
| 52 | cover |
| 6 | gripper unit |
| 60 | gripper |
| 61 | rack |
| 7 | second drive shaft |
| 8 | output shaft |
| 80 | output wheel |
| 9 | gear unit |
| 90 | gear shaft |
| 91 | second spur gear |
| 92 | third spur gear |
| 93 | fourth spur gear |
| 94 | second ring gear |
| 95 | fifth spur gear |
| 96 | sixth spur gear |
| 97 | planet carrier |
| 98 | planet shaft |
| 100 | structure |
| 101 | object holder |
| 102 | first displacement unit |
| 103 | second displacement unit |
| L1 | first axis |
| L2 | second axis |
| L3 | third axis |
| M1 | first drive |
| M2 | second drive |

The invention claimed is:

1. A transmission module for transmitting torques comprises
a base (1),
a first drive shaft (2) rotatable about a first axis (L1), a second drive shaft (7) parallel thereto rotatable about a second axis (L2),
a first output shaft (5) and a second output shaft (8), both of which are rotatable about a common third axis (L3), wherein the axes (L1;L2) of the drive shafts (2;7) are arranged parallel to the axis (L3) of the output shafts (5;8),
a gear unit (9),
wherein the two drive shafts (2;7), the gear unit (9) and the first output shaft (5) are rotatably supported in the base (1) and wherein the second output shaft (8) is rotatably supported in the first output shaft (5),
wherein the gear unit (9) is designed in such a way that a synchronous rotary movement of the two output shafts (5;8) is configured to be effected by a rotary movement of the first drive shaft (2) and in that a relative rotary movement of the two output shafts (5;8) is configured to be effected by a rotary movement of the second drive shaft (7),
characterized in that the gear unit (9) comprises a planetary gear with a sun gear (92), a planet carrier (97), at least one planet gear (93) and a second ring gear (94), wherein the first drive shaft (2) is operatively connected to and is configured to drive the first output shaft (5), wherein the first drive shaft (2) is operatively connected to and is configured to drive the second output shaft (8) by the gear unit (9) and wherein the second drive shaft (7) is operatively connected to and is configured to drive the second output shaft (8) by the gear unit (9), wherein the gear unit (9) comprises a sixth spur gear (96), which is connected to the planet carrier (97) and wherein the planet carrier (97) is rotatably mounted on the gear shaft (90) by the sixth spur gear (96).

2. A gripper module comprising a transmission module according to claim 1 and a gripper unit (6), wherein the gripper unit (6) comprises at least two grippers (60) which are displaceably mounted in the first output shaft (5) in a first plane perpendicular to the third axis (L3) and which is configured to be displaced by the second output shaft (8).

3. The gripper module according to claim 2, wherein the at least two grippers (60) are displaceably mounted in the second housing part (51).

4. The gripper module according to claim 2, wherein each gripper (60) is connected to a rack (61) and the rack (61) is displaceably mounted in the first output shaft (5) in the first plane and wherein the second output shaft (8) comprises an output wheel (80) which is operatively connected to each rack (61) and with which each rack (61) is displaceable.

5. The gripper module according to claim 4, comprising a cover (52) through which at least the grippers (60) project and which covers at least the racks (61).

6. A gripper device comprising at least one gripper module according to claim 2, a structure (100), an object holder (101) and at least one displacement unit (102;103), wherein the object holder (101) is arranged on the structure (100) with a first displacement unit (102) and/or the gripper module is arranged on the structure (100) with a second displacement unit (103).

7. The gripper device according to claim 6, wherein the first displacement unit (102) and/or the second displacement unit (103) is configured to perform displacements in a first horizontal direction and/or in a second horizontal direction perpendicular to the first horizontal direction and/or in a vertical direction.

8. The transmission module according to claim 1, the first output shaft (5) comprises a housing which completely surrounds the gear unit (9) and which comprises a first housing part (50) and a second housing part (51) connected thereto.

9. The transmission module according to claim 8, comprising a first ring gear (4) which is rotatably mounted in the base (1) and which is connected to the first housing part (50).

10. The transmission module according to claim 9, wherein the first ring gear (4) is rotatably mounted in the first base part (10) and wherein the first drive shaft (2), the second drive shaft (7) and the central gear shaft (90) are rotatably mounted in the second base part (11).

11. The transmission module according to claim 8, wherein the second housing part (51) comprises a central passage opening, which is in alignment with the third axis (L3) and through which the second output shaft (8) protrudes.

12. The transmission module according to claim 8, wherein the second ring gear (94) of the planetary gear is rotatably mounted in the first housing part (50) and is connected to the second output shaft (8).

13. The transmission module according to claim 1, wherein the gear unit (9) comprises a central gear shaft (90) which is rotatable about the third axis (L3), wherein the sun gear (92) is connected to a first end of the gear shaft (90), wherein the planet carrier (97) is rotatably mounted on the gear shaft (90) and wherein a second spur gear (91), adjacent to the planetary gear, is connected to the gear shaft (90).

14. The transmission module according to claim 1, wherein a first spur gear (3) is connected to the first drive shaft (2) and wherein the first spur gear (3) is operatively connected to the first output shaft (5) via the sun gear (92) of the planetary gear.

15. The transmission module according to claim 1, wherein a fifth spur gear (95) is connected to the second drive shaft (7) and wherein the fifth spur gear (95) is operatively connected to the second output shaft (7) via the planet carrier (97) of the planetary gear.

* * * * *